UNITED STATES PATENT OFFICE.

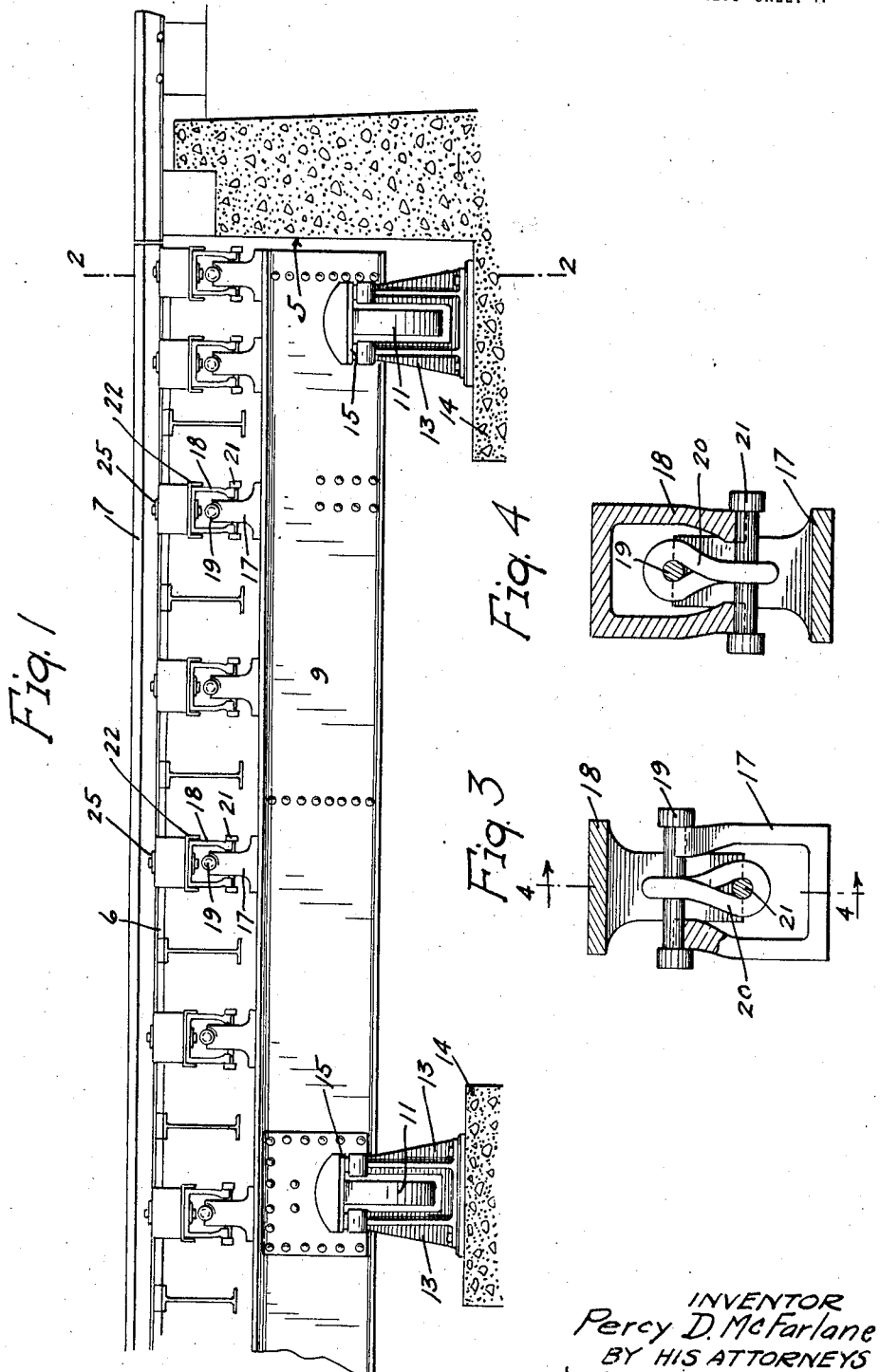

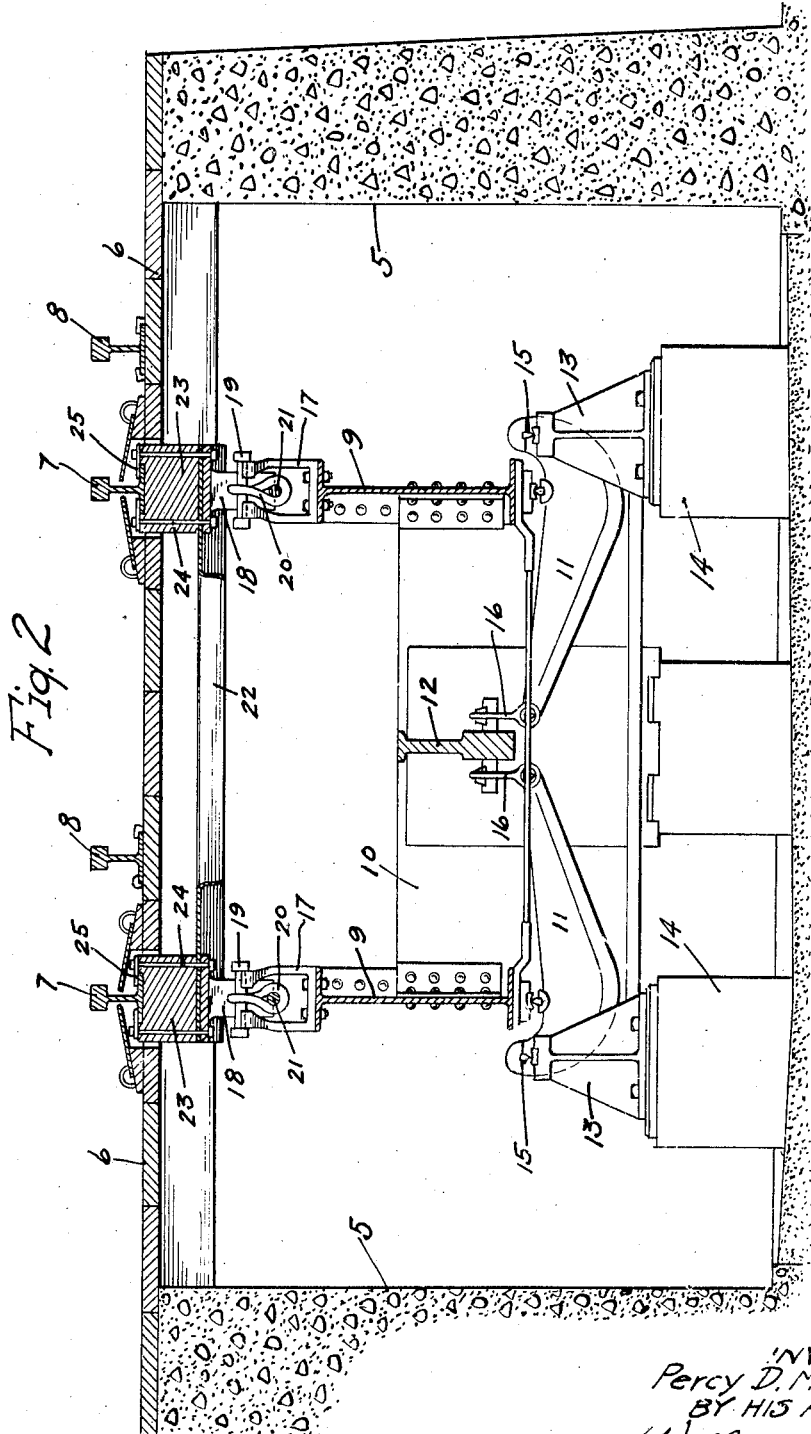

PERCY D. McFARLANE, OF MINNEAPOLIS, MINNESOTA, ASSIGNOR OF ONE-THIRD TO OLIVER A. READFIELD AND ONE-THIRD TO DANIEL J. McGRATH, BOTH OF MINNEAPOLIS, MINNESOTA.

OSCILLATING-PEDESTAL SUPPORT.

1,344,806.  Specification of Letters Patent.  Patented June 29, 1920.

Application filed April 5, 1919. Serial No. 287,670.

*To all whom it may concern:*

Be it known that I, PERCY D. McFARLANE, a citizen of the United States, residing at Minneapolis, in the county of Hennepin and State of Minnesota, have invented certain new and useful Improvements in Oscillating-Pedestal Supports; and I do hereby declare the following to be a full, clear, and exact description of the invention, such as will enable others skilled in the art to which it appertains to make and use the same.

My invention relates generally to platform scales, that is, to a heavy scale for weighing cars, wagons, trucks, and like vehicles, and is especially applicable to so-called track scales. In the drawings the invention is illustrated as applied to a track scale, but in other forms of platform scales the platform would take the place of rails and would be supported by upper pedestals (designated as live rail pedestals in a track scale), and these upper pedestals are supported by so-called weigh bridge girders. In scales of this general type, as hitherto constructed, the upper or live rail pedestals have been rigid structures, and to provide for oscillation to absorb shocks incident to the running of cars onto the rails or of vehicles onto the platform, it has been customary to provide suspension bearings to support the weigh bridge girders from the main levers of the scale mechanism. With this old arrangement, all such shocks have been carried to the weigh bridge girders and transmitted therethrough to the swinging suspension bearings; and this has been found objectionable, because it causes a displacement of the weight on the bearing pivots and produces excessive wear thereof, both of which interfere with the accuracy of the scale mechanism.

I have obtained greatly improved results by providing upper pedestals having incorporated therein, gravity centered oscillating bearings which will absorb the shocks before they have been transmitted to the weigh bridge girders. This permits the weigh bridge girders to be supported from the main scale levers, by so-called rigid bearings, that is, by bearings that do not swing or move from their set positions, and which therefore, maintain the set accuracy of the scales.

The invention, as applied to the so-called platform rail track scales, is illustrated in the accompanying drawings wherein like characters indicate like parts throughout the several views.

Referring to the drawings,

Figure 1 is a side elevation illustrating my invention applied to a track scale, some parts being in section and some parts being broken away;

Fig. 2 is an enlarged transverse section taken approximately on the line 2—2 of Fig. 1;

Fig. 3 is an enlarged view partly in front elevation and partly in vertical section, illustrating the preferred construction of one of the live rail pedestals herein designated more broadly as an upper pedestal; and Fig. 4 is a section on the line 4—4 of Fig. 3.

Of the parts of the platform and scale structure, in so far as they are illustrated, the numeral 5 indicates the concrete or masonry pit, the numeral 6 the rigid deck, the numeral 7 the live rails, the numeral 8 the dead rails, the numeral 9 the weigh bridge girders, the numeral 10 the girder tie, the numeral 11 the main scale levers, the numeral 12 one of the center extension levers, the numeral 13 the fulcrum standards, and the numeral 14 the foundation piers, all of which parts, except in so far as herein particularly noted, are of standard well known construction.

The main levers 11 are fulcrumed at 15 in the usual way on the fulcrum standards 13 and the ends of the levers 11 are connected to the extension levers 12 by the usual links 16.

The upper pedestals which, in the present illustrations, are live rail pedestals, are preferably composed, each of two approximately U-shaped cast pedestal members 17 and 18, the prongs of which are loosely overlapped in planes at right angles. A hanger pin 19 is seated in the notched upper ends of the prongs of each pedestal member 17, and on the central portion of such pin is hung a suspending link 20. The links 20 are twisted so that their ends are in vertical planes at right angles, and lower hanger pins 21 are seated in the lower loops of the said links and are seated in the notched lower ends of the prongs of the respective upper pedestal members 18. In this way, the upper pedestal members 18 are supported from the lower members 17 with freedom for universal movements in substantially horizontal direction.

The base of the lower pedestal members 17 are bolted or otherwise rigidly secured to the upper flanges of the weigh bridge girders 9, and the tops of the upper pedestal members 18 are bolted or otherwise rigidly secured to the ends of the ties 22, which, as shown, are inverted metal channels. The live rails 7, as shown, are seated on cast iron blocks 23, which, in turn, are seated on and rigidly secured to the ends of the ties 22 by nut-equipped bolts 24, which, as shown, extend through the said blocks, through the ties 22 and through the top plates of the pedestal members 18, and at their upper ends, clamp the rail clips 25 onto the flanges of the said rails 7. Of course, the live rails or, in some instances, the platform, may be connected in any suitable way to the upper or top members of the upper or rail pedestals. Also, the yielding elements of these upper pedestals may take various forms. The important thing is that these upper pedestals are constructed so that they will yield horizontally to absorb the shocks produced by running cars onto the rails or trucks onto the platform and will be centered or brought to normal position under the weight of the load. Otherwise stated, the purpose of these yielding bearings or pedestals, is to yield and prevent the scale bearings from being injured or moved from these proper positions by shocks and movements produced primarily on the live rails or platform, by cars or trucks running onto or off from the rails or platform. Obviously, these yielding pedestals applied between the live rails or platform and the weigh bridge girders accomplish this result and permit the use of what is known as rigid bearings in the scale connections proper, and moreover, relieve such scale connections from strains, shifting movements, and undue wear.

What I claim is:

1. In a scale mechanism of the kind described, the combination with weigh bridge girders and scale levers supporting the same, of pedestals mounted on said weigh bridge girders, and a platform or rail structure mounted on said pedestals, said pedestals having yielding elements permitting approximately horizontal movements of said platform or rail structure in respect to said girders.

2. In a scale mechanism of the kind described, the combination with weigh bridge girders and scale levers supporting the same, of oscillating pedestals mounted on said weigh bridge girders, and a platform or rail structure mounted on said oscillating pedestals, the bearings of said pedestals being gravity centered but capable of universal oscillatory movements in an approximately horizontal plane.

3. In a scale mechanism of the kind described, the combination with weigh bridge girders and scale levers supporting the same, of oscillating pedestals mounted on said weigh bridge girders, a platform or rail structure mounted on said oscillating pedestals, said pedestals comprising upper and lower forked members interlapped at ninety degrees, pins seated against the prongs of said forked members, and links connecting the said pins.

4. In a scale mechanism of the kind described, the combination with weigh bridge girders and scale levers supporting the same, of oscillating pedestals mounted on said weigh bridge girders, a platform or rail structure mounted on said oscillating pedestals, said pedestals comprising upper and lower forked members interlapped at ninety degrees, pins seated against the prongs of said forked members, and links connecting the said pins, the upper members of said pedestals being cross-connected by ties.

5. In a scale mechanism of the kind described, the combination with weigh bridge girders and scale levers supporting the same, of oscillating pedestals mounted on said weigh bridge girders, and a platform or rail structure mounted on said oscillating pedestals, the scale bearings between the main scale levers and said weigh bridge girders being of the rigid type, said pedestals having yielding elements permitting approximately horizontal movements of said platform or rail structure in respect to said girders.

In testimony whereof I affix my signature in presence of two witnesses.

PERCY D. McFARLANE.

Witnesses:
HARRY D. KILGORE,
BERNICE G. BAUMANN.